(12) United States Patent
Naick et al.

(10) Patent No.: US 7,480,695 B2
(45) Date of Patent: Jan. 20, 2009

(54) USING PHONE SERVICE TO INITIATE REQUESTS FOR WEB INFORMATION

(75) Inventors: Indran Naick, Cedar Park, TX (US); Jeffrey Kenneth Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1018 days.

(21) Appl. No.: 10/763,078

(22) Filed: Jan. 22, 2004

(65) Prior Publication Data

US 2005/0163105 A1 Jul. 28, 2005

(51) Int. Cl.
G06F 15/16 (2006.01)
(52) U.S. Cl. .................. 709/206; 709/219; 709/226; 709/245
(58) Field of Classification Search .......... 709/206, 709/217–219, 223–226, 245
See application file for complete search history.

(56) References Cited

U.S. PATENT DOCUMENTS

| 6,628,644 | B1 * | 9/2003 | Nelson et al. ............. 370/352 |
| 6,788,769 | B1 * | 9/2004 | Waites ..................... 379/93.24 |
| 6,842,612 | B2 * | 1/2005 | Kalish et al. ............. 455/414.2 |
| 6,859,451 | B1 * | 2/2005 | Pasternack et al. .......... 370/352 |
| 6,865,608 | B2 * | 3/2005 | Hunter .................... 709/229 |
| 6,963,928 | B1 * | 11/2005 | Bagley et al. ............. 709/245 |
| 6,999,444 | B1 * | 2/2006 | Nitta et al. ............... 370/338 |
| 7,058,726 | B1 * | 6/2006 | Osaku et al. .............. 709/245 |
| 7,155,425 | B2 * | 12/2006 | Nykanen .................. 707/3 |
| 7,206,304 | B2 * | 4/2007 | Low et al. ................ 370/352 |
| 7,251,234 | B2 * | 7/2007 | Warmus et al. ............ 370/338 |
| 7,280,530 | B2 * | 10/2007 | Chang et al. .............. 370/352 |
| 2002/0016174 | A1 * | 2/2002 | Gibson et al. ............. 455/464 |

FOREIGN PATENT DOCUMENTS

| EP | 1 185 056 A1 | 12/2000 |
| WO | WO 98/26543 | 11/1997 |
| WO | WO 02/21865 A1 | 3/2002 |
| WO | WO 02/067144 A1 | 8/2002 |

\* cited by examiner

Primary Examiner—Bunjob Jaroenchonwanit
Assistant Examiner—Van Kim T Nguyen
(74) Attorney, Agent, or Firm—Herman Rodriguez; Anthony V. S. England; Joseph P. Lally

(57) ABSTRACT

A method of retrieving information via a network by initiating a phone call by entering a dialing sequence on a telephone to make a telephone connection. If it is determined that the phone call is a request for web-based information, the requested web-based information is determined as well as a network address associated with the phone call. A network protocol request is the generated for the requested web-based information. The network protocol request is then sent to a network server capable of retrieving the information and the retrieved information is delivered to the network address associated with the phone call. Determining that the phone call is a request for web-based information may include detecting a specified sequence that is appended to the phone number. An IP address associated with the telephone may be appended to the phone call either manually or automatically.

19 Claims, 4 Drawing Sheets

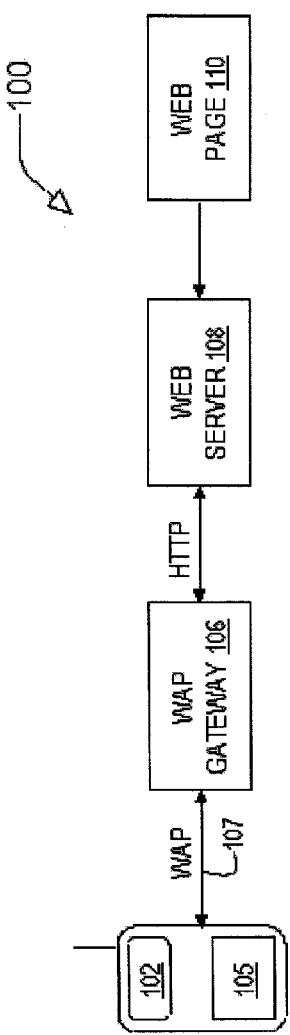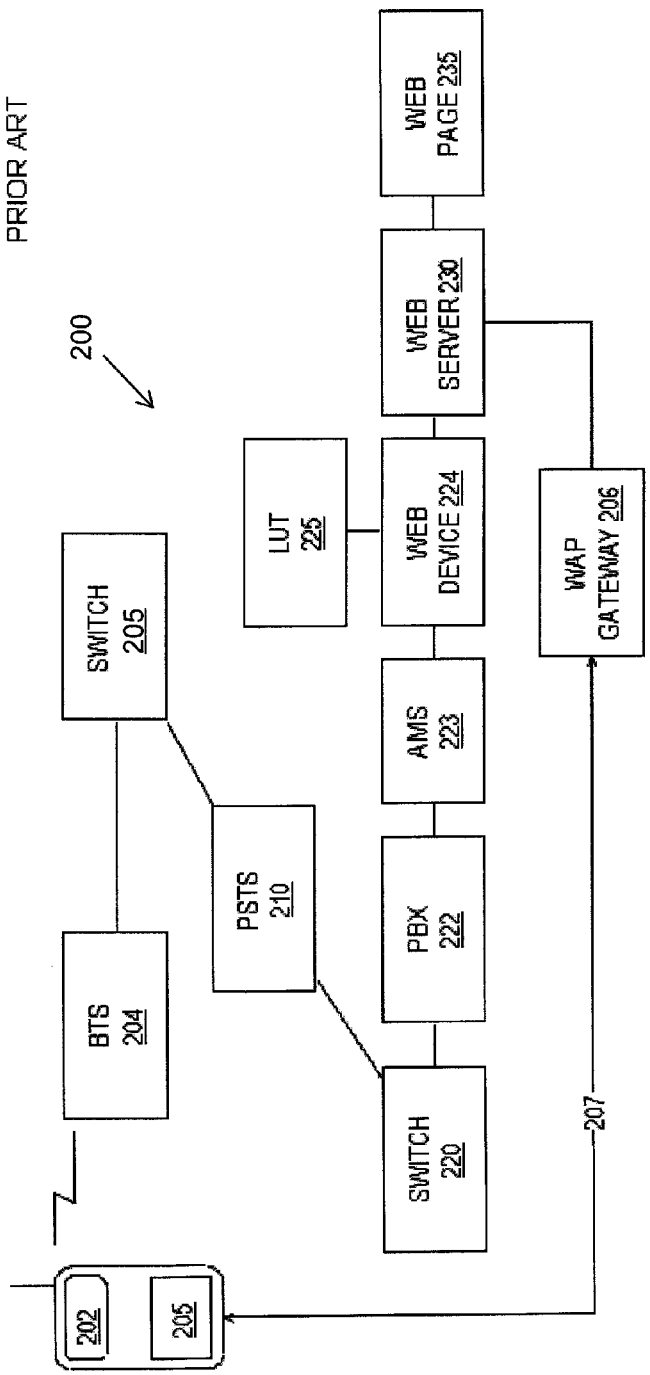

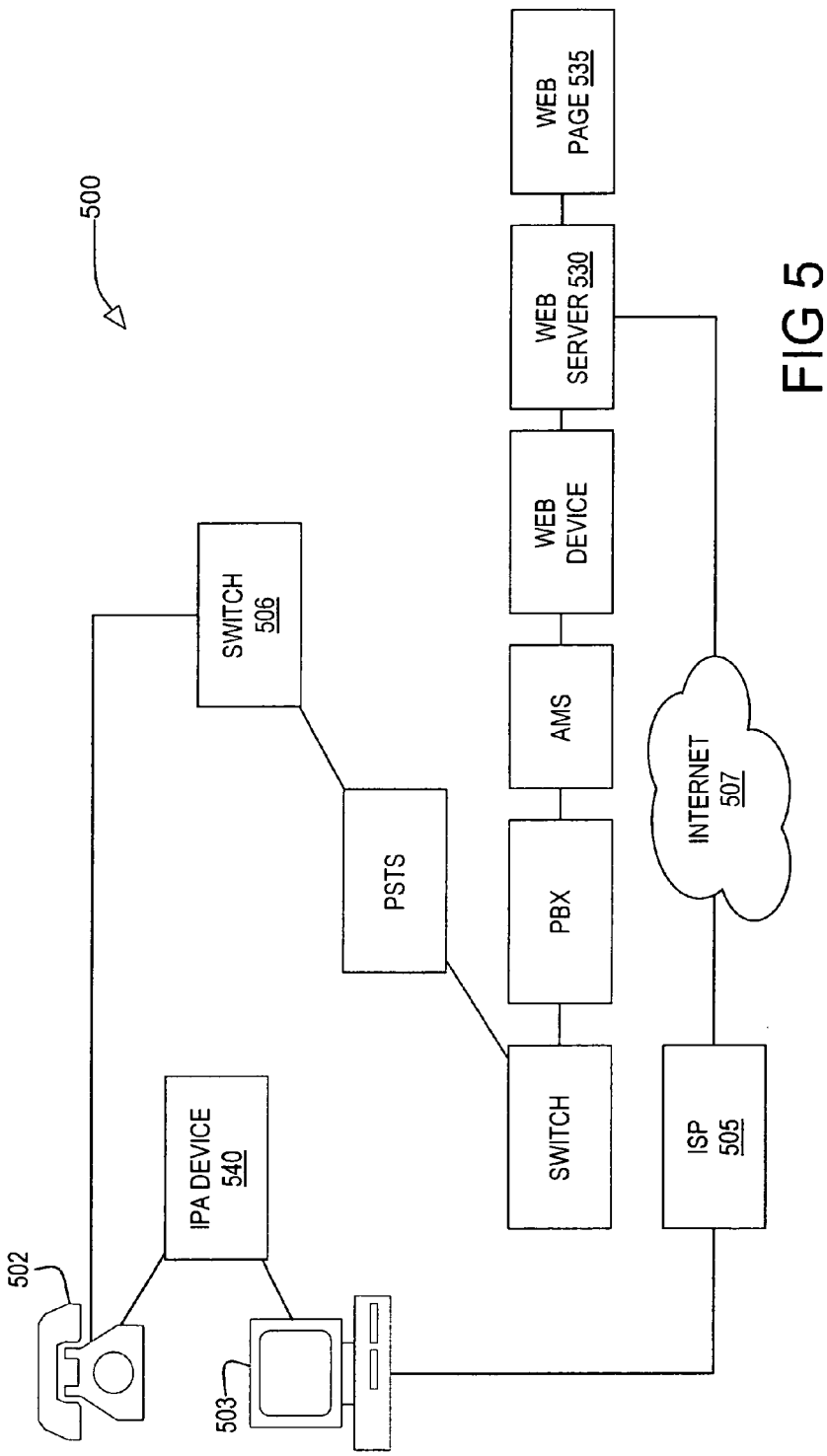
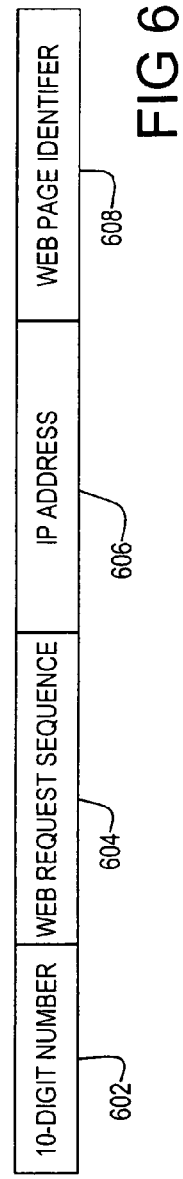

USING PHONE SERVICE TO INITIATE REQUESTS FOR WEB INFORMATION

BACKGROUND

1. Field of the Present Invention

The present invention is in the field of wireless communication and, more particularly, wireless interaction with the world wide web using cellular telephones.

2. History of Related Art

In the field of wireless communication, mobile telephone (cell phone) service providers have offered their subscribers the ability to access at least some web pages using their phones for some time. In a conventional implementation, a specialized web browser is installed on a cell phone. When the service is active (i.e., the cell phone is powered on and within the provider's network), the browser establishes a connection with a specialized gateway referred to as a Wireless Access Protocol (WAP) gateway. WAP is a collection of languages and tools for implementing services for mobile phones. The WAP gateway communicates with the mobile phones using a WAP protocol stack, which has significantly less overhead than a conventional HTTP request over TCP/IP. The WAP gateway converts WAP protocol requests into conventional HTTP requests and sends them to a conventional HTTP web server.

Referring now to FIG. 1, a block diagram of selected elements of a conventional wireless communication system 100 is depicted. In the depicted embodiment, system 100 includes a cell phone 102, a wireless access (WAP) gateway 106, and a web server 110 connected to WAP gateway 106. The user accesses web pages by opening a WAP-compliant browser 105 and enters a standard universal resource indicator (URI). WAP browser 105 sends a WAP-formatted request for the specified URI to WAP gateway 106. Gateway 106 converts the request to a conventional HTTP request and forwards the request to the appropriate web server 108 using conventional WWW technology (i.e., HTTP, TCP/IP, etc.). Web server 108 retrieves the requested content from the appropriate web page 110 and returns the content to WAP gateway 106. WAP gateway 106 converts the content to WAP-compliant content (including any content conversion required to accommodate the limited display of cell phone 102), and delivers the content to cell phone 102, and viewed by the user via WAP browser 105.

Although wireless web access, as it is described in the preceding paragraphs, is acceptable for many applications, it is not without drawbacks. The conventional web-enabled mobile phone is really two separate communication devices within a single package. The cellular telephone facilities are functionally distinct from the web facilitates. Because the two devices must share the common package, including a common I/O interface and keypad, web requests are entered using I/O elements that were largely developed specifically for telephone services. A web request, for example, is made by typing in the alphanumeric URL using the telephone keypad. Most cell phone users will be familiar with the difficulty in using a telephone keypad to enter a text string. More generally, telephone initiated web access as described above requires a highly specialized telephone (i.e., a wireless telephone with an installed WAP stack and WAP browser). Thus, while distinct phone/web mechanisms are not inherently objectionable, many users, especially casual users, may be more comfortable or efficient at using the phone service than the browser. Specifically, the process of using a cell phone's phone service is relatively intuitive for most cell phone users because of its strong similarity to using a landline phone. In contrast, using a mobile web browser installed on a cell phone is less intuitive because of the significant differences between the cell phone web browser and the standard web browser on a desktop or notebook computer including, the lack of a full keyboard that makes it extremely difficult to enter textural URIs of even moderate length.

It would be desirable to implement a system and method in which a web request could be initiated from a telephone, mobile or not, using phone-like services and request formats, such as by dialing a telephone number.

SUMMARY OF THE INVENTION

The identified objectives are achieved by a method, system, and service for retrieving information via a network by initiating a conventional phone call (i.e., by entering a dialing sequence on a telephone) to make a telephone connection. If it is determined that the phone call is a request for web-based information, the requested web-based information is determined as well as a network address associated with the phone call. A network protocol request is the generated for the requested web-based information. The network protocol request is then sent to a network server capable of retrieving the information and the retrieved information is delivered to the network address associated with the phone call. Determining that the phone call is a request for web-based information may include detecting a specified sequence that is appended to the phone number. An IP address associated with the telephone may be appended to the phone call either manually or automatically using a LUT or some other automated mechanism. Additional information about the requested web page may also be appended to the request.

BRIEF DESCRIPTION OF THE DRAWINGS

Other objects and advantages of the invention will become apparent upon reading the following detailed description and upon reference to the accompanying drawings in which:

FIG. 1 is a block diagram illustrating components of a traditional wireless web enabled cellular telephone network;

FIG. 2 is a block diagram of selected elements of a system for accessing web information using telephone service according to one embodiment of the present invention;

FIG. 5 is a block diagram of selected elements of a system according to an embodiment of the invention emphasizing the use of a landline telephone to initiate a web request; and FIG. 6 illustrates a dialing sequence format for one embodiment of the present invention.

Figure 3:
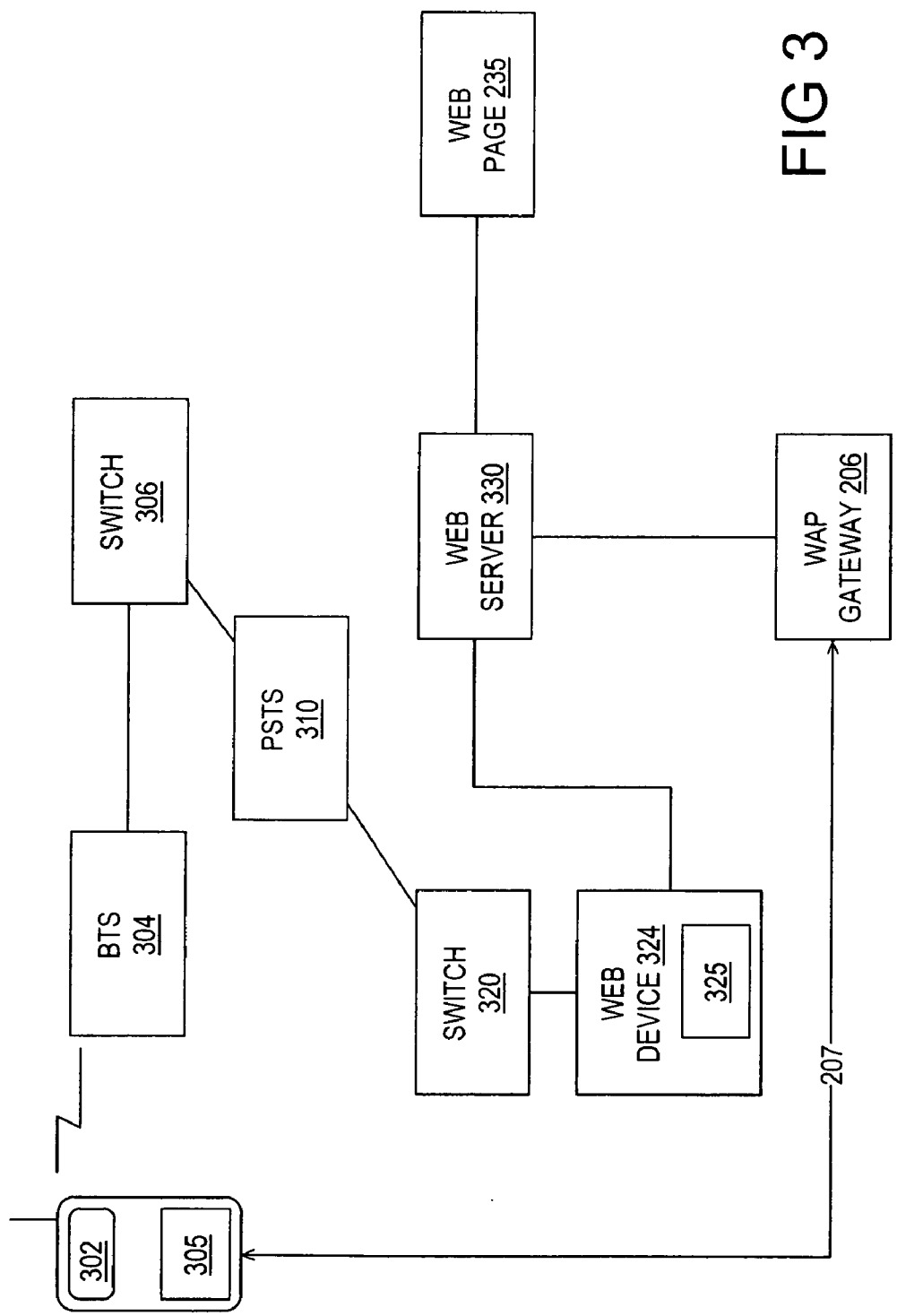
FIG. 3 is a block diagram of selected elements of a system for accessing web information using telephone service according to a second embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking the present invention describes an implementation in which the phone service features and functionality of a communication device such as a conventional landline telephone, a mobile phone, or another web-aware wireless device, are used to initiate a request for web-based information. Using phone service features to initiate a web-based request beneficially replaces the potentially difficult task of entering a URI into a wireless browser with the relatively simple task of making a simple phone call. Once the request has been initiated and delivered to a server such as an HTTP, the requested is serviced just as any other request (i.e., just as any other request initiated from an HTTP web browser on a desktop or notebook computer). In web enabled mobile phone embodiment, the request is serviced by returning the requested information to the user's cell phone via the cell phone provider's internet browsing service. In a regular telephone application, the server returns the response to a computer or other device that is associated with the telephone initiating the request. By introducing a novel technique for initiating a web request, the present invention offers a simpler mechanism for accessing web-based information from cell phones and other limited-I/O devices.

Referring now to FIG. 2, selected elements of a data processing system 200 suitable for accessing web-based data according to one embodiment of the present invention is depicted to emphasize the application of the present invention to a mobile phone implementation. In the depicted embodiment, system 200 includes a cell phone 202 having an installed web browser 205. Cell phone 202 is configured to send radio signals to a base station (BTS) 204. BTS 204 is connected to the public switched telephone service (PSTS) 210 through a switch 205. A second switch 220 connects PSTS 210 with a PBX 222. A web device 224 is connected to PBX 222 and to a web server 230, which is also connected to a WAP gateway 206.

A user of cell phone 202 according to the present invention may access a web page 235 by making a phone call. In one embodiment, the user dials a phone number that is associated with the URI of web page 235 or associated with the URI of a domain in which web page 235 resides. A telephone connection is made between cell phone 202 and an appropriate PBX 222 based on the phone number that is dialed. In the implementation depicted in FIG. 2, PBX 222 routes the call to web device 224.

Web device 224 is a special purpose device configured to identify incoming phone calls that are requests for web-based documents. In one embodiment, web device 224 recognizes "meta information" that is sent with the telephone call as an indicator that the incoming call is a request for web-based information. The meta information used may vary with implementation. In one embodiment, the meta information is an extra set of digits that represent a "port" of the answering telephone analogous to the manner in which Internet servers dedicate particular ports to particular types of requests (email, http, etc.). In the "ported" implementation, for example, the user may call an extended phone number such as (512) 555-1212.123 where the digits "123" identify the call as a request for web page information. In other embodiments, the meta information used to identify the call as a web-based request is indicated by appending a sequence of one or more special characters to the phone number (e.g., (512) 555-1212 #*#).

In one implementation, the meta information is sent to the organization after the phone connection is made. In this embodiment, analogous to the manner in which a facsimile operates, a phone call is made to a particular phone number. The cellular phone service provider, in conjunction with the public telephone system, make a conventional telephone connection to the organization. In one embodiment, an automated messaging system 223 answers the call. Messaging system 223 may provide the user with a prompt indicating a sequence to be entered to generate a web request. In any event, messaging system 223 recognizes a predetermined sequence of numbers and/or special characters as indicating the user's desire to initiate a web request. This embodiment is desirable for its ability to enable an existing phone number to be used for regular telephone calls as well as for web requests. A single phone number, for example, could be used for voice and for web requests depending upon the meta information that is sent after the connection is made.

In another implementation, a phone number is dedicated to servicing web requests. In this implementation, meta information appended to the basic 10-digit phone number may or may not be needed. If the particular phone number is dedicated to a corresponding web page or web document, for example, then the 10-digit phone number may be sufficient to initiate the web request. In another implementation, however, the 10-digit phone number may correspond to a entire domain or to a group of web pages. In this case, additional meta information is used to specify the particular web page within the domain or group that the user wishes to receive.

Regardless of the meta information specifics, system 200 is configured to "ping" an organization to request a web page or other web based data. As depicted in FIG. 2, for example, pinging the organization for a web page is achieved by routing the phone call to web device 224. The organization responds by returning data indicative of the web page contents back to the user. In the depicted embodiment, web device 224 responds to an incoming phone call (and any meta information provided with the call) by determining a web page 235 that is associated with the user's request. In one embodiment, the phone number dialed by the user uniquely identifies the web page 235. In other embodiments, the phone number, in conjunction with any meta information sent with the phone call determines the appropriate web page.

After determining the web page being requested, web device 224 sends a conventionally formatted HTTP request for web page 235 to a web server 230. The request transmitted by web device 224 indicates a location to which the requested information should be delivered. In the depicted embodiment, for example, in which cell phone 202 is connected to a WAP gateway 206, the request may indicate WAP gateway 206 as the location to which the response generated by web server 230. Web server 230 would then establish a conventional (TCP/IP) connection with WAP gateway 206. Web server 230 then services the request by retrieving content from web page 235 and forwarding the retrieved data to WAP gateway 206. WAP gateway 206 then delivers the retrieved Web page content (or a WAP-compliant version of the web page content) to cell phone 202 via WAP connection 207. Cell phone 202 then displays the retrieved content with browser 205.

To achieve this result, web device 224 includes a mechanism for associating the incoming phone call with an IP address of the requester (i.e., the IP address to which the requested web page should be delivered. In one embodiment, the requestor's IP address information is appended to the phone call (as discussed in greater detail below) and is simply parsed by web device 224 upon receiving the phone call. In another embodiment, web device 224 includes or has access to a look up table (LUT) 225. LUT 225 contains a list of phone numbers and, for each phone number, corresponding internet account information that may be used to determine an IP address associated with the phone number. In many applications, end users are assigned IP addresses dynamically, meaning that the IP address of a particular user changes from one session to the next. In such cases, LUT 225 cannot simply store phone numbers and corresponding IP addresses. Instead, LUT 225 contains information that can be used by web device 224 to determine the current IP of a user associated with the phone number. In one implementation, LUT 225 might contain the requestor's ISP user account name and password, which would have been provided to the user during a previous session. When web device 224 receives a phone number from a particular incoming phone call, retrieves ISP account and password information from LUT 225 and sends a request to the ISP to determine the IP address that is currently assigned to the corresponding user account. This request may be sent via HTTP, email, or some other mechanism.

In one embodiment, the IP address associated with the requestor is appended to and sent as part of the telephone call. In the case of a web-enabled cell phone such as is shown in FIG. 2, appending IP information is relatively straight forward because the cell phone 202 is the web device. In other words, cell phone 202 is aware of its current IP address because this information is part of the web connection that cell phone 202 makes with the wireless ISP and is either stored locally on cell phone 202 or is retrievable from the ISP.

The above-illustrated embodiments of the invention comprise a single device (i.e., the web-enable cell phone with an installed wireless web browser) that initiates the web request and receives the requested information. While such an implementation has wide applicability, the present invention is not limited to the use of web-enabled cell phones or to cell phones at all. In one embodiment, the request for web based information is initiated from a telephone (cell phone or not) that is not web enabled. A user could, for example, initiate a web request by dialing the appropriate phone number (the phone number associated with the web page or domain of interest) from the requestor's conventional, landline phone at home or in the office. In this embodiment, when the HTTP formatted request is generated and sent, it includes a source URI (the URI of the requestor) indicating a network resource of the requester, such as a TCP/IP connection between a data processing system of the requestor and the requestor's Internet service provider (ISP). This association between a phone number and a network resource might be defined through a registration process with the phone company or with the organization that maintains the web page or domain of interest. In any event, the response is delivered to a network resource or device that is distinct from the device initiating the request.

In the case of a landline telephone, appending IP information to the phone call is more difficult because the IP address is not associated with the telephone itself but rather with a computer or other device that is Internet connected. In such cases, the IP information may be appended to the phone manually in response to a voice messaging prompt. More preferably, IP address information is appended to the phone call automatically using a device that connects to the user's telephone and computer.

Referring to FIG. 5, a communication system 500 according to an embodiment of the present that works in conjunction with conventional (landline) telephones is presented. In the depicted embodiment, a landline telephone 502 connects to the PSTS through a switch 506. The web server 530 that ultimately handles the telephone initiated web request is connected to a conventional desktop, notebook, or other data processing device (computer) 503 through the user's ISP 505 and the internet 507. A device referred to herein as the IP address (IPA) device 540 is connected between computer 503 and telephone 502. IPA 540 is configured to provide the computer's current IP address to telephone 502 when telephone 502 is initiating a web request.

Telephone 502 (as well as cell phone 202 of FIG. 2) may indicate when a telephone call is initiating a web request by appending a sequence of one or more special characters to the end of the phone number sequence. The sequence may be part of or distinct from the appended sequence described above to identify to the web page provider that the call is a web request and to indicate the information that is requested. In one embodiment, for example, the 10 digit phone number is followed by a first special character sequence that causes the caller's current IP address to be appended to the call. The IP address may then be followed by additional information indicating, for example, which of several web pages associated with the 10 digit number is requested. One embodiment of a generalized format 600 for a calling sequence to initiate a web request is shown in FIG. 6. In the depicted calling sequence, a 10-digit phone number 602 is followed by a sequence 604 identifying the phone call as a web request. An IP address 606 of a computer or wireless device associated with the caller is appended to the web request sequence 604. Additional information such as information indicating which of a group of web pages may be appended to calling sequence 600. In this sequence, some of the fields may be appended automatically. Specifically, the IP address field 606 may be determined by the cell phone 202 (FIG. 2) or landline phone 502 (in conjunction with IPA 540) and appended to the calling sequence automatically following detection of the web request sequence 604 by cell phone 202 or IPA 540. The web request sequence 604 may also alert the receiving side of the phone call that the call is a web request. In this implementation, a common web request sequence is recognized at both ends of the phone call connection. In FIG. 2, for example, AMS 223 recognizes web request sequence 604 and passes it to web device 224. Web device 224 can then parse the IP address information 606 and any additional information 608 necessary to generate the appropriate HTTP request to web server 230. In some cases, parts of calling sequence 600 may be provided manually after the basic telephone connection is made. If the web device 224, 524 does not detect an IP address field 606 following a web request sequence 604, the user may then be prompted to enter the field.

Referring now to FIG. 3, selected elements of a system 300 according to the present invention are depicted to emphasize an embodiment in which the web device that recognizes a phone call as a "phone-to-HTTP" request is implemented as part of the phone company's switch. In this embodiment, cell phone 302 initiates a call via BTS 304 and switch 306 through PSTS 310 to a second switch 320. A web device 324 analogous to web device 224 of FIG. 2 is connected to switch 320 and is configured to identify phone calls that represent phone-to-HTTP requests. Web devices 324 may identify such requests based on meta information that is associated with the phone connection in a manner similar to the way web device 224 of FIG. 2 identifies web requests. Web device 324 is also configured to associate a phone-to-HTTP request with a corresponding IP address using a LUT 325 analogous to LUT 225 of FIG. 2. This embodiment of the invention implements the web device 324 at the phone company switch 320 such that the phone company's customers do not have to purchase additional hardware or software but may, instead, purchase or license the services of web device 324.

Figure 4:
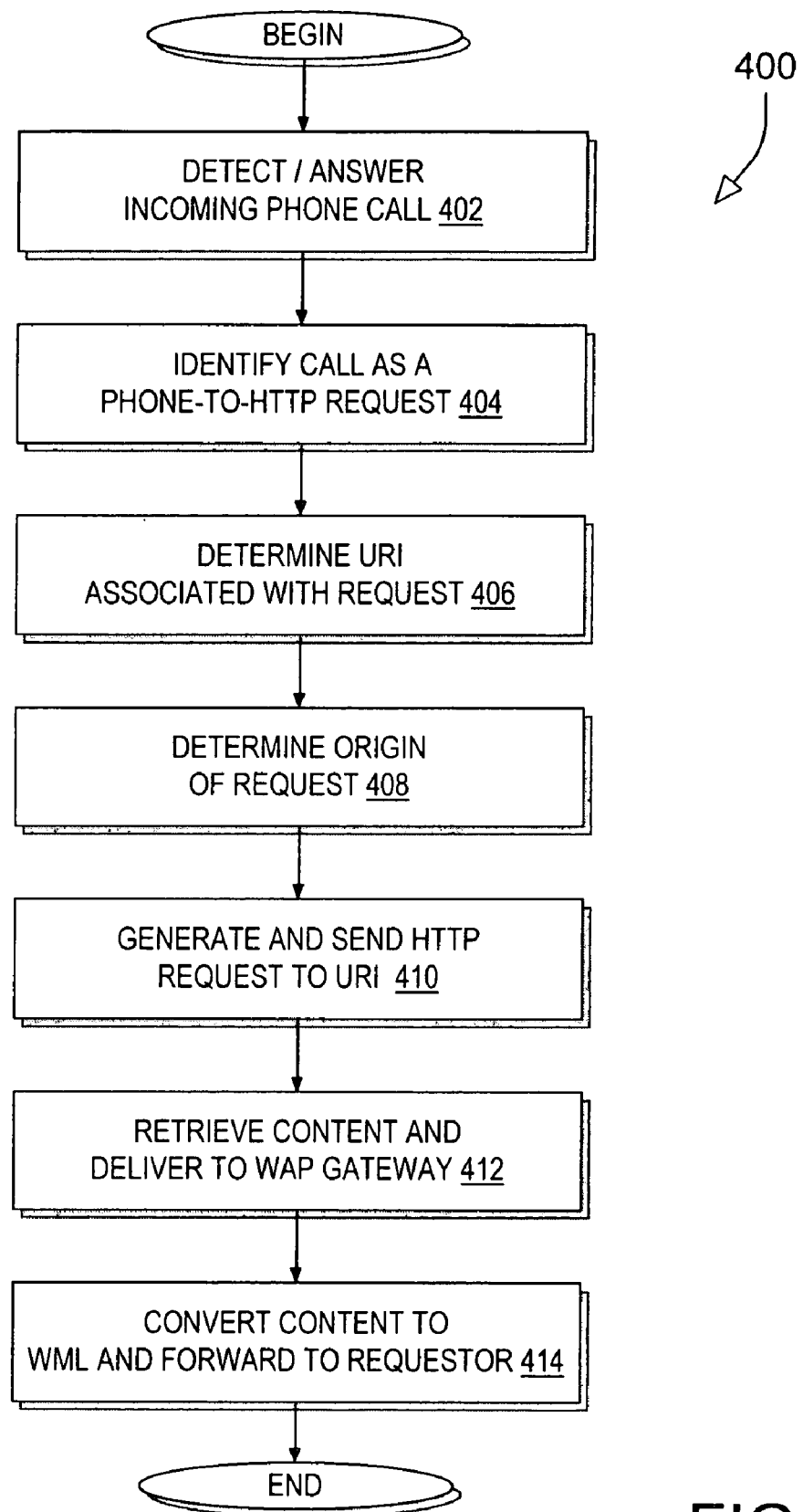
FIG. 4 is a flow diagram of a method of retrieving web information by initiating a request using telephone service.

Referring now to FIG. 4, one embodiment of the invention is a method 400 of requesting and retrieving networked information, such as the content from a web page maintained on the Internet, using conventional phone service to initiate the request. Initially, an incoming phone call is detected (block

402). The incoming phone call is initiated by a user and detected by a switching device whether it is a switch owned by the phone company or a PBX type switch that is associated with a particular organization. The incoming call is then identified (block 404) as a phone-to-HTTP request (i.e. a request for web-based information initiated over the telephone network). Identification of the call as a request for web information is achieved using meta information that is provided with or in addition to the phone call signal itself. As described above, the meta information may be conveyed using telephone keypad entries after the phone call connection is made.

After determining that the call is a request for web-based information, the URI of the requested data and the origin of the request are determined (blocks 406, 408). Determining the URI of the requested data may include accessing a stored look up table that indicates phone numbers and their associated URI's. In other embodiments the phone number itself or the phone number in combination with meta information provided with the phone number uniquely identifies the corresponding URI. Determining the origin of the request is necessary to respond to the request. In a conventional wireless web implementation, in which a web request is transmitted over internet protocol channels (whether a WAP connection or an HTTP connection), the requestor is identified in the request. When a request is made using the phone system as described herein, an alternative mechanism for identifying the requester is needed. In one embodiment, the requester is identified by the phone number of the phone used to initiate the request. In the embodiment in which the web device is connected to the phone company's switch, the phone company can determine the origin of the request based on the requestor's phone number. The phone company may maintain information associated with each phone number and this information could include a URI or similar information enabling the web server to address a response to the request to an appropriate location. In an embodiment in which the switch resides within the organization that maintains the requested web page (or other information), the organization may maintain a table associating requesting phone numbers with their URI's. In many cases, the URI or IP address associated with a requester is dynamically assigned by the requestor's service provider. In such cases, a table of requestor URI's is generally not practical as indicated previously. Instead, the requestor information may identify the URI of the WAP gateway to which the requestor is connected. It may then be the task of the WAP gateway to determine how to rout web responses. If, for example, the response provided to the WAP gateway is delivered to the WAP gateway along with information indicating the requestor's phone number, the WAP gateway may use store information to determine the appropriate routing for each web response received.

After the source and destination of a request are determined, an HTTP formatted request is sent (block 410) to the destination URI. The HTTP request is handled in the same manner as any conventional request (i.e., a request initiated with a traditional browser from a desktop or laptop computer) for a web page. The requested content is retrieved (block 412) from web site by the web server and delivered to the WAP gateway. The WAP gateway then converts (block 414) the content to a Wireless Markup Language (WML) or some other format compatible for delivery over the WAP connection and display on the cellular phone and sends the converted data to the requestor's phone and browser where the requestor can view the retrieved information.

Another embodiment of the invention encompasses a service of configuring or enabling a system such as system 200 of FIG. 2 or system 500 of FIG. 5. In this embodiment, a service provider configures the user's cell phone or landline phone/computer combination and configures an organizations call handling system to generate and respond to phone-to-HTTP requests as described above.

It will be apparent to those skilled in the art having the benefit of this disclosure that the present invention contemplates a system and method mechanism for initiating requests for web based information using conventional phone facilities. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of retrieving information via a network, comprising:
   receiving a phone call initiated by a dialing sequence, wherein the dialing sequence was entered by a caller to make a telephone connection on a telephone of the caller, wherein the dialing sequence includes at least a telephone number;
   determining that the phone call includes a request for web-based information, wherein the determining includes detecting meta-information received with the telephone number in the dialing sequence;
   determining the web-based information requested, wherein the telephone number in conjunction with any meta-information sent with the telephone call determines the web page requested;
   determining a network address of a return response device of the caller, wherein the web-based information is to be returned to the caller at the return response device, and wherein the network address is not associated with the telephone by receiving a network protocol formatted request generated by the telephone nor by receiving a network protocol formatted return address generated by the telephone;
   generating a network protocol request for the requested web-based information; and
   sending the network protocol request to a network server capable of retrieving the web-based based information, wherein sending the network protocol request includes sending the network address to the network server for enabling the network server to forward delivering the retrieved information to the return response device at the network address.

2. The method of claim 1, wherein determining the network address of the return response device includes receiving the network address by the network address bemnn appended to the dialing sequence.

3. The method of claim 2, wherein receiving the network address appended to the dialing sequence includes receiving at least a portion of the network address after the telephone connection is made.

4. The method of claim 1, wherein the method includes:
   receiving a telephone number for the caller's telephone during the phone call and wherein determining the network address of the return response device includes looking up a network address for the return response device responsive to receiving the caller's telephone number.

5. The method of claim 1, wherein the caller's return response device is physically separate from the telephone and determining the network address of the return response device includes:

receiving the network address from an address generating device physically separate from the telephone and connected to the telephone and the caller's return response device, so that the sending of the network address for the caller's return response device to the network server enables the network server to forward the retrieved information to a device physically independent of the telephone.

6. The method of claim 5, wherein receiving the phone call comprises receiving a phone call from a landline telephone.

7. The method of claim 6, wherein the caller's return response device includes a desktop computer.

8. A telephone system, comprising:
an automated call handler configured to receive a telephone call from a telephone of a caller and to determine if the telephone call is a request for web-based information,
wherein the automated call handler is further configured to determine that the telephone call is a reciuest for web-based information responsive to detecting meta-information received with a telephone number in a dialing sequence for the received telephone call; and
wherein the telephone number in conjunction with any meta-information sent with the telephone call determines the web page reciuested;
a web device configured for i) determining web-based information associated with the request and an IP address of a return response device of the caller to which the web-based information is to be returned to the caller, and wherein the IP address is not associated with the telephone by receiving a network protocol formatted request generated by the telephone nor by receiving a network protocol formatted return address generated by the telephone, and ii) generating an HTTP request for the web-based information;
a web server connected to the web device, the web server being configured to respond to receipt of the HTTP request by retrieving the requested web-based information and sending the retrieved information to the return response device at the IP address.

9. The system of claim 8, wherein the automated call handler is configured to determine the network address of the return response device by receiving the IP address, the network address being appended to the dialing seguence.

10. The system of claim 9, wherein receiving the network address appended to the dialing sequence includes receiving at least a portion of the network address after the phone connection is made.

11. The system of claim 10, wherein a telephone number of the automated call handler is associated with a plurality of web pages and further wherein at least a portion of the specified sequence identifies one of the plurality of web pages as the requested web-based information.

12. The system of claim 8, wherein the system includes a look up table (LUT) having at least a telephone number of the caller's telephone and corresponding information indicative of the IP address of the caller's return response device, and the web device is configured to look up a network address for the return response device responsive to receiving the caller's telephone number.

13. The system of claim 8, wherein the automated call handler is configured to process the telephone call as a voice telephone call if the telephone call lacks the specified sequence.

14. A communication service, comprising:
enabling an automated call handler to detect request for web-based information responsive to receiving a dialing sequence from a caller's telephone, the dialing sequence having at least, a telephone number for making a telephone call connection;
wherein the enabling includes configuring the automated call handler to determine that the telephone call is a request for web-based information responsive to detecting meta-information received with a telephone number in the received dialing sequence; and
wherein the telephone number in conjunction with any meta-information sent with the telephone call determines the web page requested;
enabling an IP address sending device connected to the caller's telephone to determine an IP address of a web-connected return response device of the caller, the return response device being physically independent of the caller's telephone; and
enabling the call handler to respond to receipt of the telephone call by generating an HTTP request for the web-based information and sending the request to a web server containing the web-based information.

15. The service of claim 14, wherein the caller's telephone comprises a landline telephone and wherein the web-connected, return response device is a web-connected computer to which the caller's telephone and the IP address sending device are connected.

16. The service of claim 14, wherein enabling the call handler to respond to receipt of the caller's telephone call includes enabling the call handler to recognize a predetermined sequence appended to the caller's telephone dialing sequence or entered after the caller's phone call connection is made.

17. The service of claim 16 wherein the predetermined sequence includes an IP address associated with the telephone or with a computer connected to the telephone.

18. The service of claim 17, further comprising enabling the IP address sending device to append the IP address to the phone call.

19. The system of claim 12, wherein the caller's return response device is physically separate from the telephone and the determining of the network address of the return response device includes:
receiving the network address from an address generating device physically independent of the telephone and connected to the telephone and the caller's return device, so that the sending of the network address for the caller's return device to the network server enables the network server to forward the retrieved information to a device physically independent of the telephone.

* * * * *